United States Patent

Kim et al.

Patent Number: 5,889,844
Date of Patent: Mar. 30, 1999

[54] CONFERENCING METHOD FOR TELEPHONE SWITCH SYSTEM

[75] Inventors: Dae Sik Kim; Yong Pil Hou, both of Kyoungki-do; Mi Sun Min, Seoul, all of Rep. of Korea

[73] Assignee: Hyundai Electronics Industries Co., Ltd., Kyoungki-do, Rep. of Korea

[21] Appl. No.: 769,088

[22] Filed: Dec. 18, 1996

[30] Foreign Application Priority Data

| Dec. 19, 1995 | [KR] | Rep. of Korea | 1995-52263 |
| Dec. 19, 1995 | [KR] | Rep. of Korea | 1995-52264 |
| Dec. 19, 1995 | [KR] | Rep. of Korea | 1995-52265 |
| Dec. 19, 1995 | [KR] | Rep. of Korea | 1995-52266 |

[51] Int. Cl.$^6$ .............. H04M 3/42; H04M 1/00; H04B 7/14
[52] U.S. Cl. .............. 379/202; 379/202; 379/215; 379/201; 379/158; 455/416; 455/519
[58] Field of Search .............. 379/202, 203, 379/204, 205, 206, 215, 201, 158; 455/518, 519, 414, 415, 416

[56] References Cited

U.S. PATENT DOCUMENTS

| 4,150,259 | 4/1979 | Fenteon et al. ............. 179/18 |
| 4,550,224 | 10/1985 | Winchell ..................... 379/202 |
| 4,611,095 | 9/1986 | LeBlanc et al. ............. 179/18 |
| 4,876,711 | 10/1989 | Curtin ....................... 379/214 |
| 4,937,856 | 6/1990 | Natarajan ................... 379/205 |
| 5,127,001 | 6/1992 | Steagall et al. ............. 379/202 |
| 5,450,405 | 9/1995 | Maher et al. ............... 455/519 |
| 5,475,747 | 12/1995 | Bales et al. ................ 379/201 |
| 5,530,914 | 6/1996 | McPheters .................. 455/518 |
| 5,544,237 | 8/1996 | Bales et al. ................ 379/202 |
| 5,583,925 | 12/1996 | Bernstein ................... 379/202 |
| 5,619,555 | 4/1997 | Fenton et al. ............... 379/202 |
| 5,619,561 | 4/1997 | Reese ......................... 379/202 |

FOREIGN PATENT DOCUMENTS

| B-15008/92 | 10/1992 | Australia | 3/56 |
| 405014525 | 1/1993 | Japan | 3/56 |

*Primary Examiner*—Krista Zele
*Assistant Examiner*—Benny Q. Tieu
*Attorney, Agent, or Firm*—McAulay Nissen Goldberg Kiel & Hand, LLP

[57] ABSTRACT

A conferencing method for a telephone switch system for performing a conferencing function. In addition to a simple conferencing function, if there is a call request from a new subscriber, a conferencing function subscriber makes the existing subscriber wait, and communicates with the new subscriber or selects to communicate with the existing subscriber. Also, if it is desired to delete a specific subscriber, the specific subscriber can be deleted during conferencing communication, using a deletion key and a deletion code. If it is intended to delete some subscribers and add some subscriber during the conferencing communication, deletion and addition can be simultaneously performed, thereby achieving various conferencing services.

7 Claims, 6 Drawing Sheets

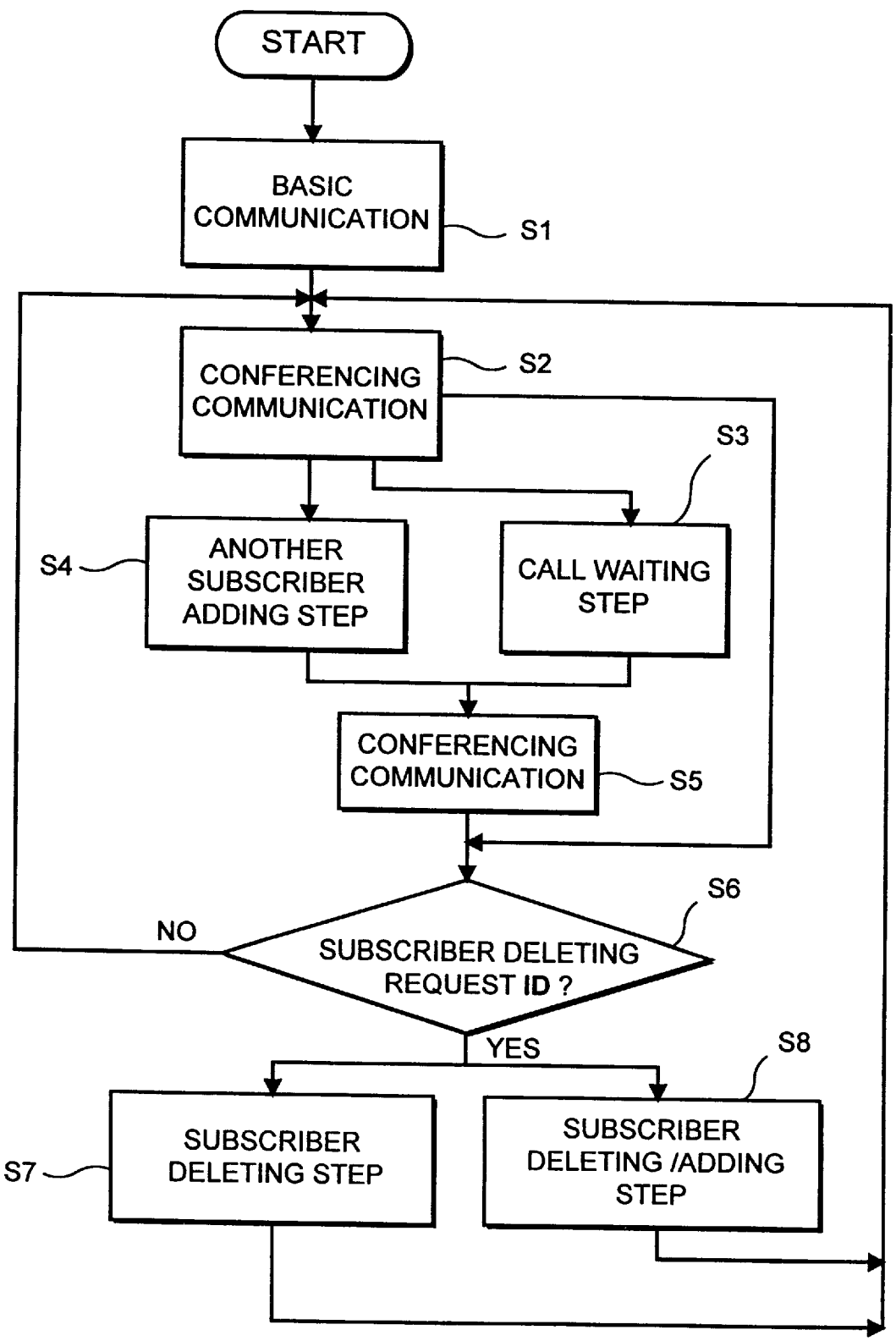
F I G. 3

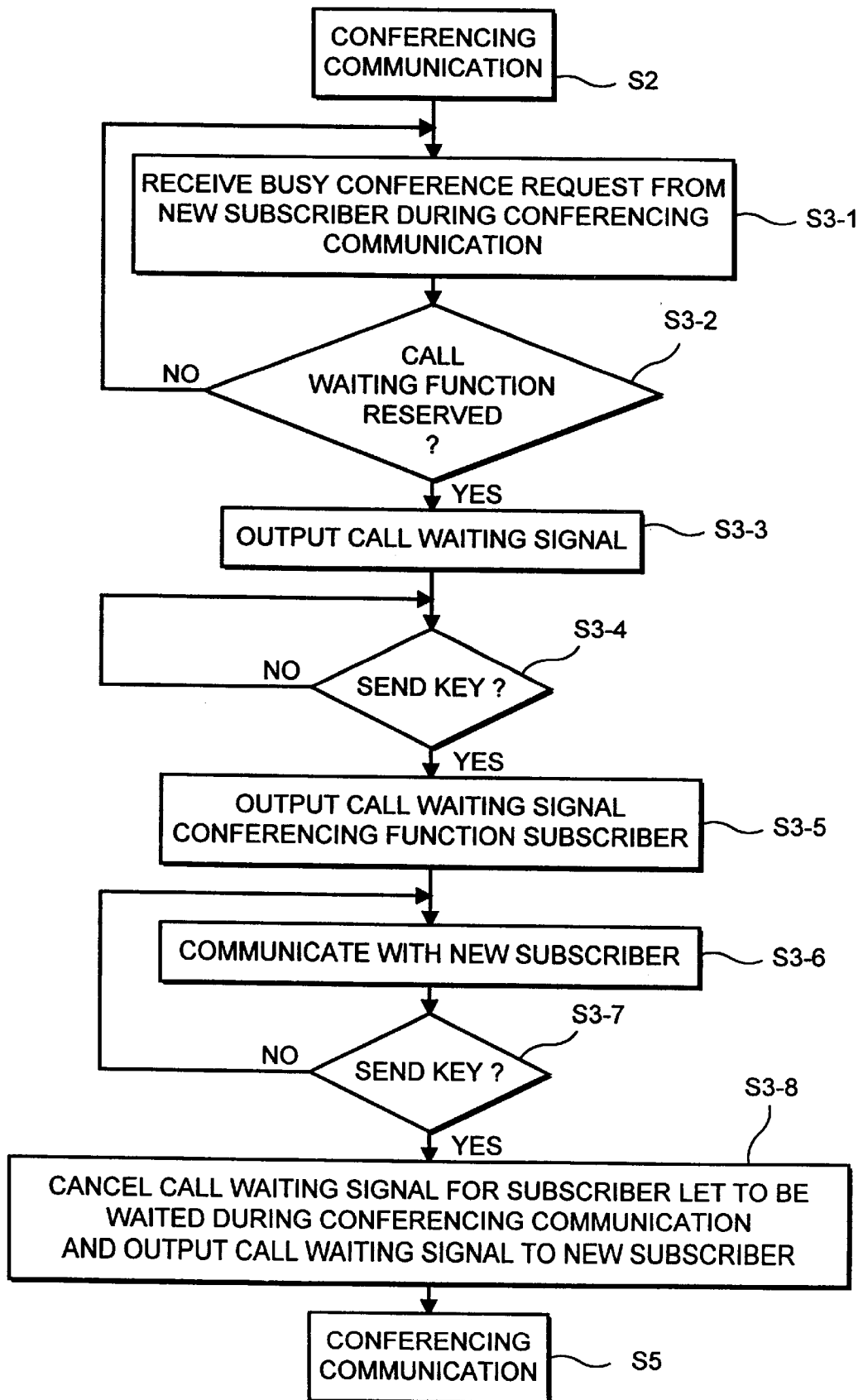
F I G. 4

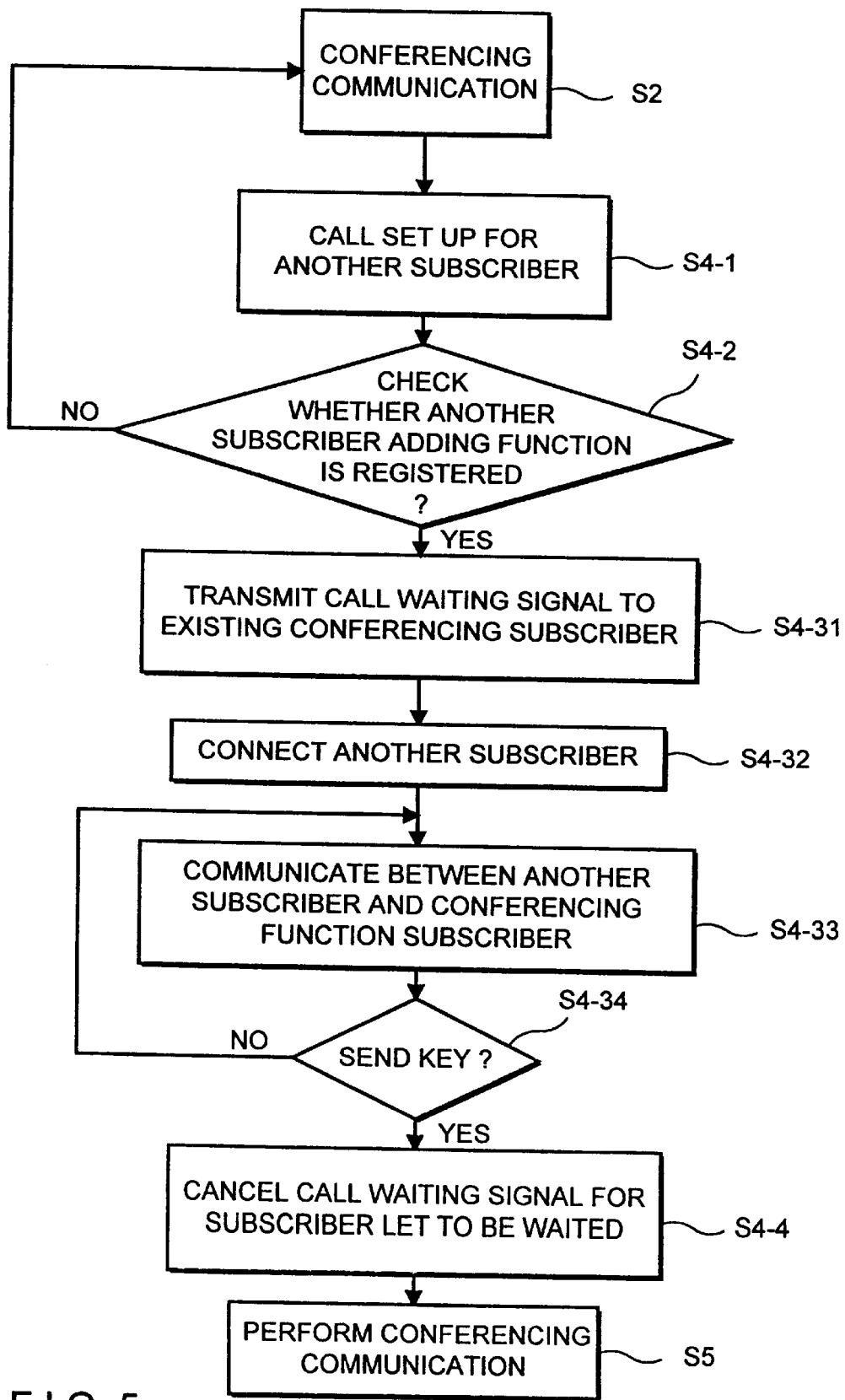
F I G. 5

CONFERENCING METHOD FOR TELEPHONE SWITCH SYSTEM

BACKGROUND OF THE INVENTION

The present invention relates to a conferencing method for a telephone switch system, wherein a call waiting function and a subscriber deleting or adding function are offered to a subscriber equipped with a conferencing function so that a call waiting service is executed to communicate with a new subscriber if there is a call request from the new subscriber, and a specific subscriber is deleted or added on necessity during a conferencing communication, when the subscriber equipped with a conferencing function (conferencing function subscriber) attends the conferencing communication.

In accordance with the development of industrial technology, business affairs become complicated and varied, which requires increasingly much time for handling the business affairs.

Various efforts have been tried for attaining time for handling the business affairs at the maximum. A plurality of subscribers conduct a conference by communicating with one another over telephone, without gathering together at a particular site.

A conferencing function is generally provided in a telephone switch system.

However, according to the conventional conferencing method, a conferencing function subscriber simply communicates with his initially selected conferencing function subscriber. Thus, it is not possible for the conferencing function subscriber to communicate with a third party nor for another subscriber to attend the conference later, before the conference is over. A voice processing interface for a conference system is disclosed in the U.S. Pat. No. 5,483,588, which provides a voice processing technology, but discloses a basic technology of conferencing services, involving limitation in providing various services, however.

SUMMARY OF THE INVENTION

It is an object of the present invention to provide a call waiting service method for conferencing communication, wherein if a new call is received during the conferencing communication, a subscriber equipped with both conferencing function and call waiting function selects the new call to allow parties engaged in the conferencing communication to communicate with each other and the calling party of the new call is waited, and all subscribers engaged in the conferencing communication are connected to resume the conferencing communication.

It is another object of the present invention to provide a conferencing service method by which another subscriber can join in conferencing communication while a conferencing function subscriber attends the conferencing communication.

It is still another object of the present invention to provide a specific subscriber deleting service method during conferencing communication which can delete a specific subscriber from the conferencing communication in such a manner that a subscriber equipped with a conferencing function subscriber deleting function manipulates a key during conduction of the conferencing communication.

It is yet another object of the present invention to provide a subscriber deleting/adding service method during conferencing communication which can delete a specific conferencing function subscriber even if the maximum number of subscribers are engaged in the conferencing communication, and allow another subscriber to additionally attend the conferencing communication.

To accomplish the object of the present invention, there is provided a conferencing service method for a telephone switch system comprising the steps of: allowing an existing subscriber's call to be waited when there is a call request from a third party and processing a call with the third party; deleting a specific subscriber such that a conferencing function subscriber equipped with a subscriber deleting function presses the specific subscriber's number during conferencing communication; allowing another subscriber to attend the conferencing communication during the conferencing communication; and deleting and adding subscribers.

BRIEF DESCRIPTION OF THE DRAWINGS

The above objects and advantages of the present invention will become more apparent by describing in detail a preferred embodiment thereof with reference to the attached drawings in which:

FIG. 3 is a signal flow diagram showing a conferencing method according to the present invention;

FIG. 4 is a signal flow diagram showing a call waiting procedure according to the present invention;

FIG. 5 is a signal flow diagram showing an another subscriber adding procedure according to the present invention.

DETAILED DESCRIPTION OF THE INVENTION

Hereinbelow, detailed embodiments of the present invention will be described in detail with reference to accompanying drawings.

Figure 1A:
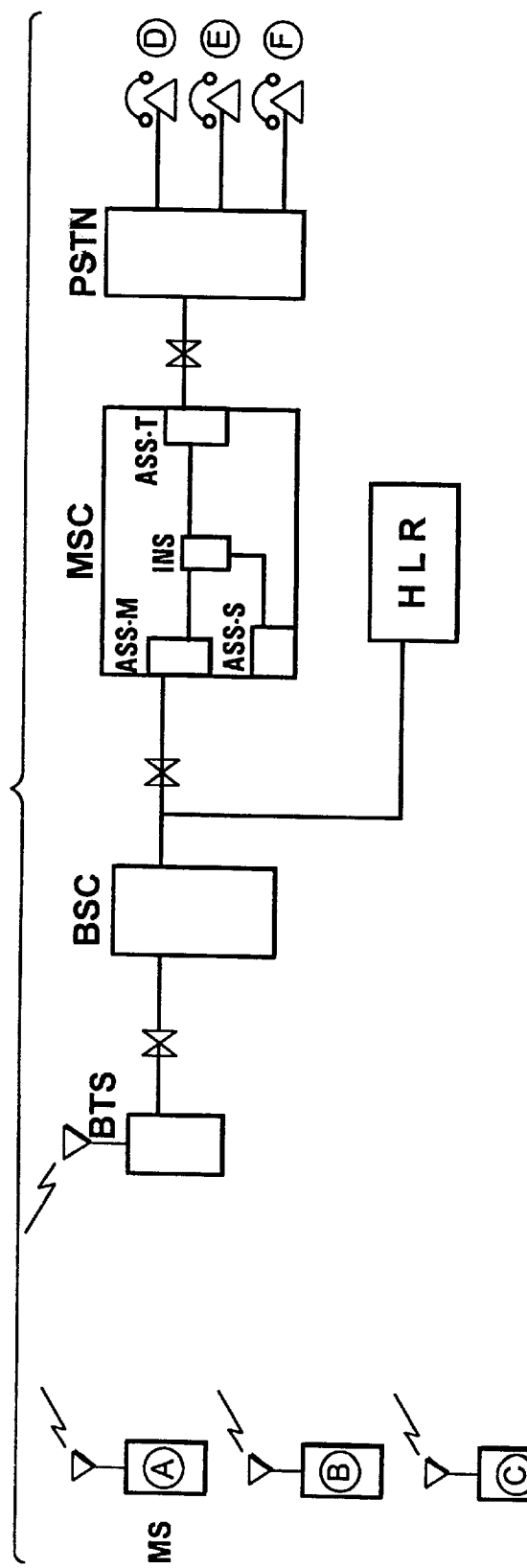
FIG. 1A is a block diagram of a telephone exchange system adopting a conferencing method according to the present invention.
Figure 1B:
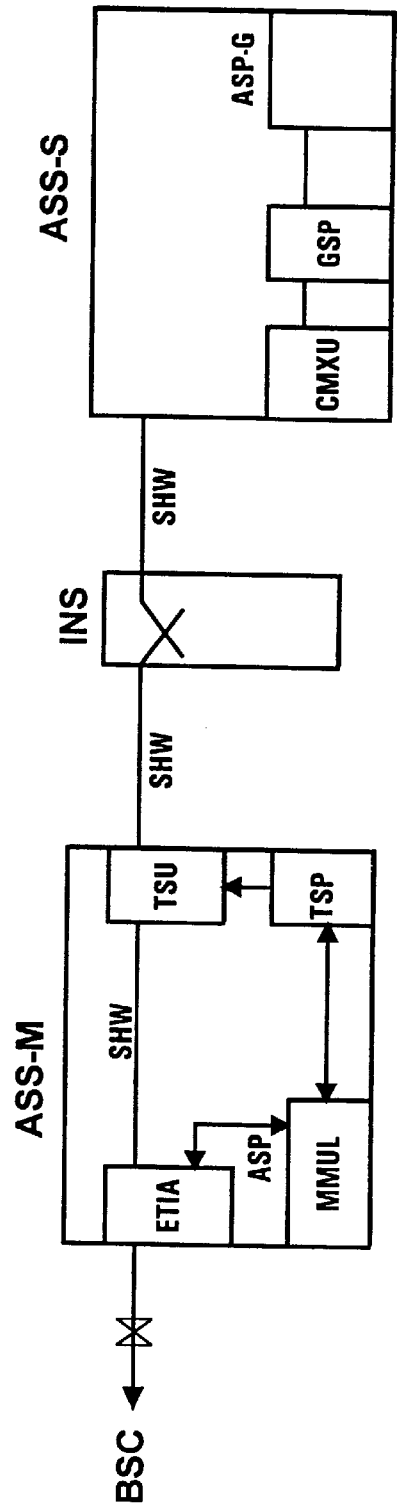
FIG. 1B is a detailed block diagram of a mobile switch center shown in FIG. 1A.

A telephone switch system for performing a conferencing function adopted in the present invention is shown in FIG. 1, which includes a plurality of mobile stations (MS) represented by subscribers A, B and C (Specifically, a conferencing function subscriber is represented by A.), a base transmission station (BTS) for transmitting and receiving data to/from the plurality of mobile stations (MS) in a wireless manner, a base station controller (BSC) for communicating with the respective BTS' in a wire manner and selecting the corresponding BTS, a mobile switch center (MSC) for directing a selection control of the BSC in a wire manner, providing the data selected by the BSC to a public switch telephone network (PSTN) or transmitting responsive data to the BSC, a home location registration (HLR) for registering a conferencing function subscriber among subscribers selected from the BSC in a No. 7 signaling method through a wire, and the PSTN for receiving the wired data from the MSC to select subscribers, e.g., D, E and F, and establishing a communication path of the corresponding subscriber to transmit the same to the MSC.

In this case, the MSC includes a mobile access switch server (ASS-M) for transmitting and receiving a call to/from the BSC. The ASS-M has an extended T1 trunk interface board assembly (ETIA) for interfacing the transmission and reception of the call with the BSC, a mobile multiway controller (MMUL), an access switch processor for transmitting and receiving the call with the ETIA, a time switch unit (TSU) connected to the ETIA and a sub-highway (SHW) to then be connected to a next inter network subsystem (INS) and a highway and controlled by a time switch processor (TSP), and the time switch processor (TSP) connected to the ASP to control the TSU, for transmitting and receiving the call with the ASP.

The MSC also includes a call mixer unit (CMXU), a global service processor (GSP), and an access switch subsystem for subscriber (ASS-S) having an access switch processor (ASP-G) for mixing voice between subscribers.

Further, the MSC includes an access switch subsystem for trunk (ASS-T) for transmitting and receiving a call with a PSTN subscriber.

The MSC guides the voices of both parties from the ASS-M and ASS-T to be mixed in the ASS-S, and includes an inter network subsystem for transmitting the mixed voice to the ASS-M and ASS-T.

Figure 2:
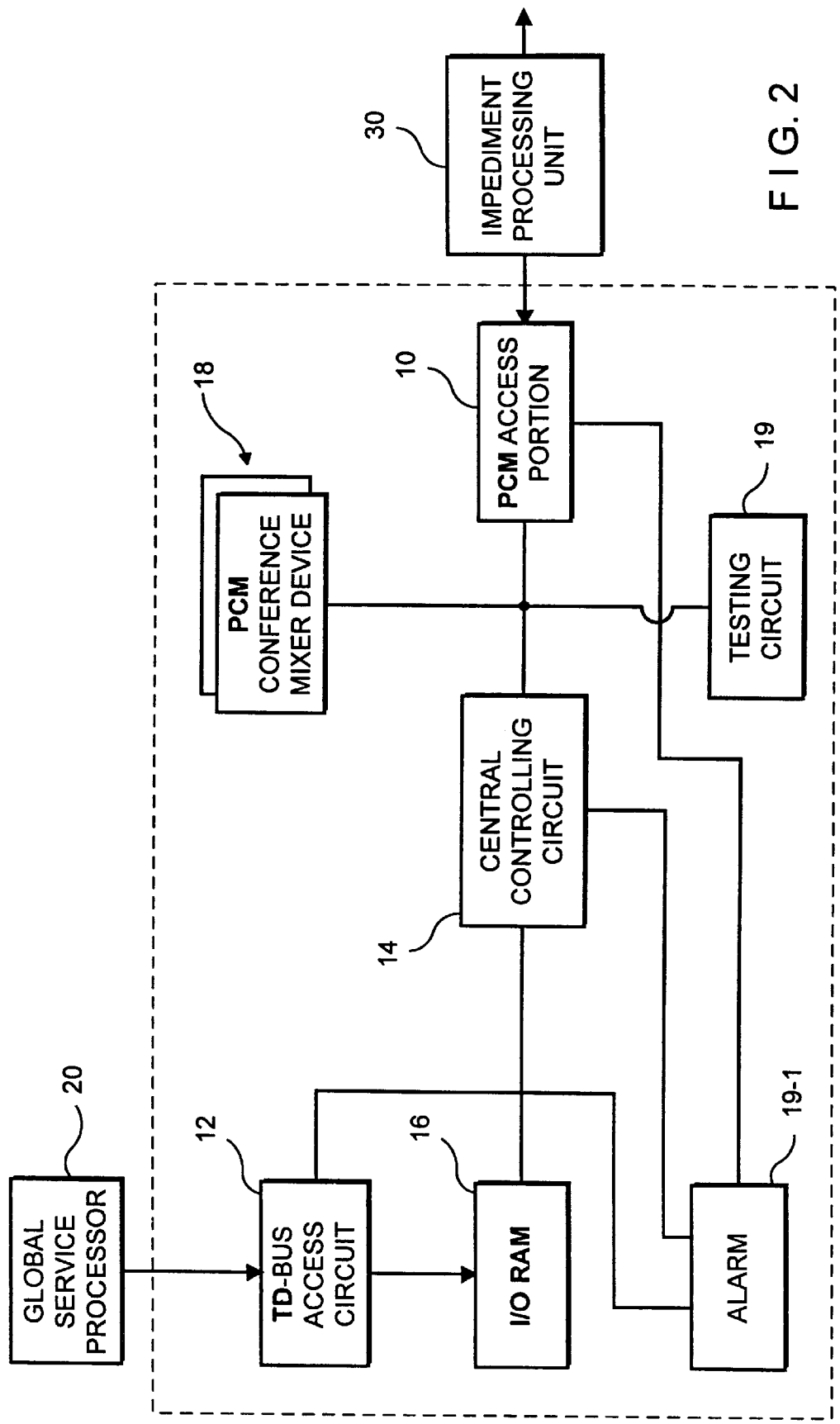
FIG. 2 is a block diagram showing input-versus-output relationship of a conference mixer circuit board assembly (CMCA) constituting a call mixer unit (CMXU) according to the present invention.

The ASS-S includes the call mixer (CMXU), which is comprised of five conference mixer circuit board assemblies (CMCAs). FIG. 2 shows a CMCA and input/output portions corresponding thereto.

The CMCA includes a PCM access portion 10 connected to the TSU and SHW constituting the ASS-M in the MSC for interfacing voice data of subscribers, a TD-bus access circuit 12 connected to the global service processor 20, an I/O RAM 16 for inputting and outputting data between the TD-bus access circuit 12 and a central controlling circuit 14, a PCM conference mixer device 18 for receiving voice data between subscribers through the PCM access portion 10 and voice-mixing the same to allow a conference, a testing circuit 19 divided from a common node between the central controlling circuit 14 and PCM access portion 10 for testing a fault of a loop path between the subscribers, and an alarm 19-1 for detecting faults from the TD-bus access circuit 12, central controlling circuit 14 and PCM access portion and generating an alarm to an impediment processing unit 30.

In this case, the central controller 14 controls the GSP 20 to receive data transmitted to the I/O RAM 16 through the TD-bus access circuit 12 for performance of conferencing service.

The TSU receives PCM data (DX) transmitted from the PCM access portion 10 and outputs PCM data (DR) to apply the same to the PCM access portion 10. Also, the TSU outputs a clock signal CLK and a frame sync signal FS to supply the same to the PCM access portion 10 of the CMXU (CMCA)).

In other words, according to the application of a subscriber (e.g., A), the subscriber is registered in the home location registration (HLR). The registered subscriber is requested to register in a visitor location registration (not shown) in advance. Also, the voice is mixed in the CMXU included in the ASS-S of the MSC so that the MS calls the subscriber to allow a call between both parties or multiple parties. Thus, the subscribers engaged in the conference can hear their own voices while attending the conferencing communication.

FIG. 3 is a flow diagram showing the conferencing service method according to the present invention, in which the algorithm for the conferencing service is performed in a mobile multiway controller (MMUL) of the ASP in the ASS-M installed in the MSC.

The conferencing service method according to the present invention is performed by the steps of performing a basic communication by a conferencing communication or a general telephone communication between subscribers (step S1), conferencing with a conferencing function subscriber by selecting the conferencing function during the basic communication (step S2), making an existing conference subscriber wait and communicating with another subscriber if there is a call request from another subscriber during the conferencing communication (step S3), adding another subscriber during the conferencing communication and allowing the conferencing communication to be continued (step S4), conferencing again after the steps S3 and S4 (step S5), checking whether the conferencing function subscriber generates an subscriber deleting ID and performing the conferencing procedure of the step S2 if not (step S6), selectively performing a subscriber deleting procedure if the subscriber deleting ID is generated in the step S6 and then going back to the conferencing step S2 (step S7), and deleting/adding subscribers (step S8).

During the conferencing communication according to the present invention, in the call waiting step S3, as shown in FIG. 4, while the conferencing communication is performed over telephone, if a busy conference request is received in the MMUL from a new subscriber (e.g., a subscriber D) searching after a conferencing function subscriber (e.g., the mobile station (MS) A shown in FIG. 1) (step S3-1), the MMUL determines whether a call waiting function is offered to the new subscriber proposing the busy conference request (step S3-2). It is assumed that the call waiting function of the subscribers is registered in the visitor location registration (VLR) controlled by the ASP of the ASS-M installed in the MSC.

If the new subscriber is equipped with the call waiting function, the MMUL outputs a call waiting signal to the subscriber subject to check for the busy conference request, for example, the conferencing function subscriber (Here, it is assumed that the call waiting function is registered.) to notify that there is the busy conference request (step S3-3).

Accordingly, if the busy conference requested subscriber (e.g., the conferencing function subscriber) presses a transmission key (e.g., a "SEND" key) (step S3-4), the MMUL (hereinbelow, to be broadly referred to as an exchange system) outputs a call waiting signal to all subscribers attending the conferencing communication to hold the communication (step S3-5). Then, a new subscriber (e.g., a subscriber D) and the busy conference requested subscriber (e.g., the conferencing function subscriber A) are connected to perform a telephone communication between both parties (step S3-6). If the busy conference requested subscriber presses the transmission key again after completing the communication, the exchange system determines whether a transmission signal is input to the MMUL of the ASP.

In such a state, if the transmission key is input again, the exchange system cancels the call waiting signal for all subscribers let to be waited in the course of conferencing communication, and outputs the call waiting signal to a new subscriber (step S3-8) to switch to the conferencing communication to resume the conferencing communication with existing subscribers engaged in the conferencing communication (step S5). By such an operation, whenever a transmission key is input, a call waiting service can be repeatedly rendered during conferencing communication.

Therefore, according to the present invention, if there is a newly received call in the course of conferencing communication over the telephone, the subscriber equipped with a call waiting function (conferencing function subscriber) selects a subscriber engaged in the conferencing communication with a calling party of the new call by his/her key manipulation so that telephone communication and conferencing communication are performed. Thus, the conferencing function subscriber can be noticed of an urgent contact even during his/her attending in the conference.

As shown in FIG. 5, in the step of adding subscribers during conferencing communication (step S4), if there is a call request from another subscriber to the exchange system (step S4-1) while performing telephone communication (step S2), the exchange system checks whether the conferencing function subscriber registers a subscriber adding function for setting another subscriber (step S4-2).

At this time, if the conferencing function subscriber does not register the subscriber adding function for setting another subscriber, the exchange system disregards the input of a call set-up for another subscriber to allow the conferencing communication to be continued (step S4-2). Meanwhile, if the conferencing function subscriber registers the subscriber adding function for setting another subscriber, the exchange system transmits a call waiting signal to the existing subscriber being engaged in telephone communication (step S4-31). Then, another subscriber and the subscriber equipped with the subscriber adding function, i.e., the conferencing function subscriber, are mutually connected (step S4-32) to allow both parties to perform telephone communication (step S4-33).

In such a state, the exchange system determines whether a 'send' key which is provided in the conferencing function subscriber's telephone is input, and performs the step S4-33 if the send key is not input (step S4-34). If the send key is input, the exchange system stops transmitting the call waiting signal to the subscriber whose call is waited (step S4-4), and then all parties, i.e., the conferencing function subscriber, another subscriber and waiting subscriber, are connected so that all parties perform the conferencing communication (step S5).

Therefore, it is possible to add subscribers one by one in the course of performing the telephone communication, such that the subscriber equipped with the subscriber adding function manipulates a key. In other words, a plurality of subscribers can attend the conferencing communication. Further, a subscriber who need not attend the conference may be excluded from the conference according to the option of the conferencing function subscriber.

According to the conferencing communication of the present invention, in the subscriber deleting step (step S7), as shown in FIG. 3, if a key signal is input in the course of performing the conferencing communication (step S2 or S5), a provisional step of determining whether the input key is a subscriber deleting request ID (e.g., to be set as '*') is performed.

In this case, if the subscriber deleting request ID is input, the subscriber deleting step S7 is performed.

In other words, the exchange system determines whether the subscriber who inputs the subscriber deleting request ID is equipped with the conferencing function subscriber deleting function. If yes, the exchange system deletes a specific subscriber corresponding to the subscriber code requested by the conferencing function subscriber and the deleting request key from the conference, and allows the other subscribers to continue the conferencing communication.

In other words, in the subscriber deleting step S7 of the present invention, if the subscriber equipped with the subscriber deleting function (the conference function subscriber) sequentially presses a '*' key (the subscriber deleting request ID key), a specific subscriber code key and a deletion key (e.g., a 'SEND' key), the exchange system performs a deleting function by deleting the specific subscriber corresponding to the specific subscriber code from the conferencing communication to then return to the conferencing step S2.

Here, the specific subscriber code is given in the order of attending in the conferencing communication, where '1' is given to the subscriber who first requested for the conferencing communication (the conference function subscriber), and '2' is given to the subscriber who is connected with the first requesting subscriber by making a call to the subscriber. Specific subscriber codes are set such that serial numbers are given in the order of the subscribers engaged in the conference. The subscriber codes can be utilized in deleting subscribers from the conferencing communication.

Therefore, while the conferencing communication is performed by using the telephone, specific subscribers engaged in the conferencing communication are deleted one by one such that the conference function subscriber manipulates keys, thereby deleting a specific subscriber who completes a predetermined task during the conferencing communication so that the specific subscriber may not attend the conferencing communication any longer.

Figure 6:
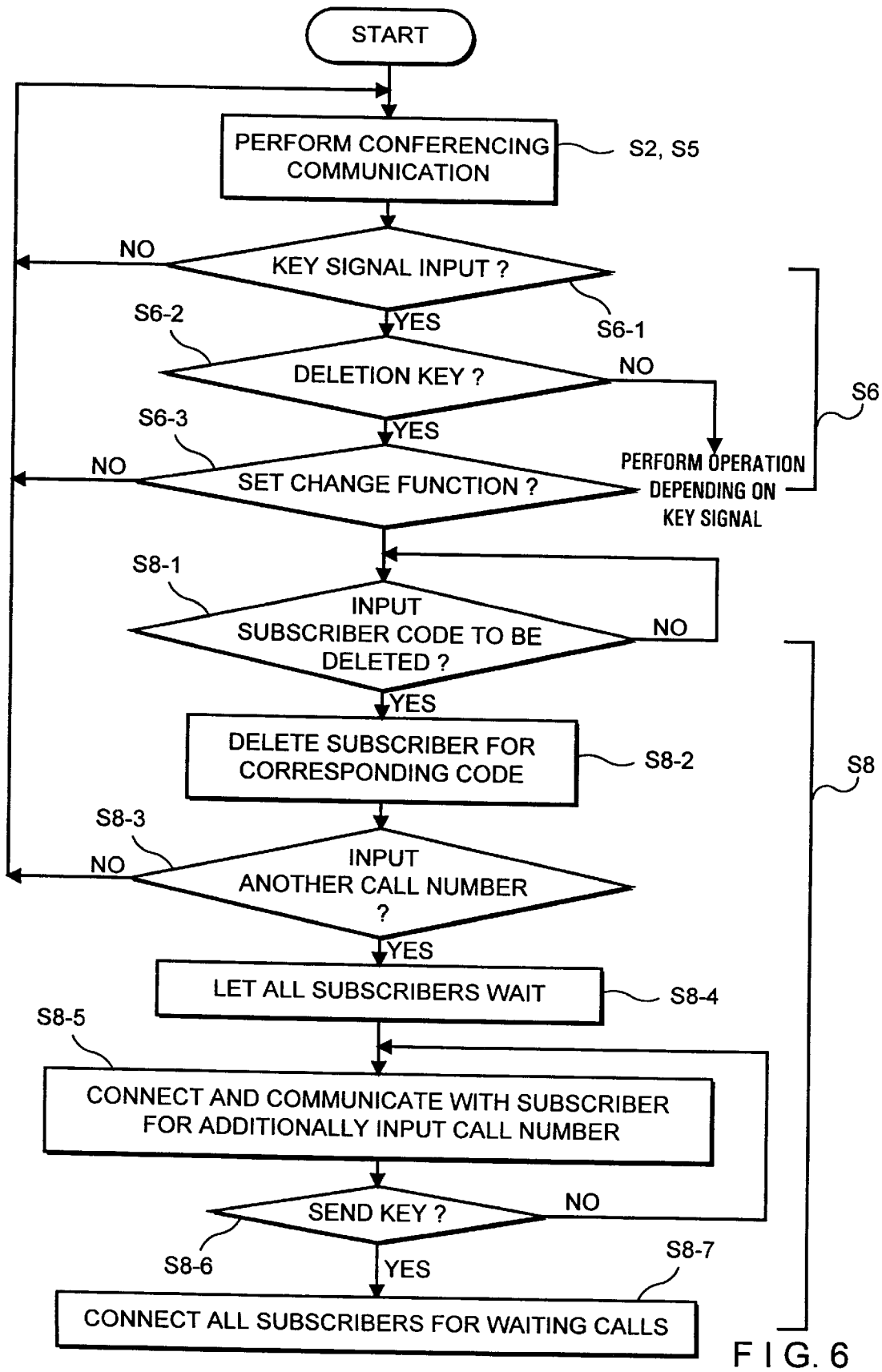
FIG. 6 is a signal flow diagram showing a subscriber deleting/adding procedure according to the present invention.

The subscriber deleting/adding step S8 during the conferencing communication of the present invention, as shown in FIG. 3, is performed in the exchange system (MSC). As shown in FIG. 6 in detail, while the conferencing communication is performed over the telephone (step S2 or S5), if a key signal from the conference function subscriber is input to the MSC (step S6-1), it is determined whether the input key is a change (deletion) key (e.g., '*' key), and the operation depending on the input key signal is performed if not (step S6-2). However, if it is determined that the input key is the change key, the MSC checks whether the corresponding change function (deleting function) is offered to the conference function subscriber, thereby completing to check whether the subscriber deleting ID key (the deletion key, e.g., the '*' key (step S6).

After the steps S6-3, the exchange system waits until the subscriber code to be deleted is input from the conference function subscriber (step S8-1), and deletes the corresponding subscriber if the corresponding code (to-be-deleted subscriber code) is input (step S8-2). Next, it is determined whether a call number to be added if necessary, is input, and continues the conferencing communication if the to-be-added call number is not input (step S8-3). If the to-be-added call number is input, the exchange system controls a call waiting signal to be generated to all conferencing function subscribers simultaneously (step S8-4), and allows communication by connecting the subscriber of the additionally input call number (step S8-5). The MSC waits until an arbitrary transmission key (e.g., a 'send' key) set for necessity of a conference function is pressed, i.e., until the 'send' key signal is received, the MSC waits (step S8-6). If the transmission key is pressed, all subscribers are connected so that the waiting subscriber and added subscriber perform the conferencing communication together (step S8-7), thereby completing the subscriber deleting/adding step S8.

Here, the conferencing function subscriber code in the step S8-1 is given in the order of subscribers attending the conferencing communication, where '1' is given to the subscriber who first requested for the conferencing communication (the conference function subscriber), and '2' is given to the subscriber who is connected with the first requesting subscriber by making a call to the subscriber. Specific subscriber codes are set such that serial numbers are given in the order of the subscribers engaged in the conference.

At this time, if the to-be-added call number is not input, the conferencing communication is continuously performed among the undeleted existing conferencing function subscribers (step S8-3). If the to-be-added call number is input, the conferencing communication is continuously performed among the undeleted existing conferencing function subscribers, a call waiting signal is transmitted to the other conferencing function subscribers to hold all subscribers, excluding the conferencing function subscriber equipped with both the conferencing function and subscriber deleting/adding step (sep S8-4). Then, the subscriber of the additionally input call number and the conference function subscriber are connected so that both parties perform the telephone communication between both parties (step S8-5)

In such a state, if the conference function subscriber presses the transmission signal (e.g., 'send' key) (step S8-6), the waiting existing conferencing function subscribers are all connected (step S8-7) so that both parties perform conferencing communication.

Therefore, it is possible to delete a specific conferencing function subscriber in the course of performing the conferencing communication and to add another subscriber to perform the conferencing communication. An unnecessary subscriber can be deleted during the conferencing communication and a necessary subscriber can be added to perform the conferencing communication.

What is claimed is:

1. A conferencing method for a telephone switch system comprising the steps of:

performing a basic communication by a conferencing communication or a general telephone communication between subscribers (step S1);

conferencing with a conferencing function subscriber by selecting the conferencing function during the basic communication (step S2);

making an existing conference attendee wait and communicating with another subscriber if there is a call request from another subscriber during the conferencing communication (step S3);

adding another subscriber during the conferencing communication and allowing the conference to be performed additionally (step S4), said adding of another subscriber by the conference function subscriber being by a conference call supervisor;

conferencing again after said steps S3 and S4 (step S5);

checking by said conference function supervisor whether said conferencing function subscriber generates a subscriber deleting ID and performing said conferencing procedure of said step S2 if not (step S6);

selectively performing a subscriber deletion procedure if said subscriber deleting ID is generated in said step S6 and then going back to said conferencing step S2 (step S7);

deleting/adding subscribers (step S8); and said subscriber deleting/adding step S8 being comprised of:

determining by said conference call supervisor whether said conferencing function subscriber is equipped with both the conferencing function and the subscriber deleting/adding function if said conferencing function subscriber's key input is a change key while the conferencing communication is performed (step S6);

deleting a corresponding subscriber from said conferencing communication if it is determined by said conference call supervisor to be said conference function subscriber in said step S6, and determining whether a call number is input (steps S8-1 through S8-3), where said steps S2 and S5 are repeatedly performed so that the other subscribers continuously perform the conferencing communication if no call number is input in said steps S8-1 through S8-3;

holding another subscriber excluding said function subscriber if a call number is input in-said step S8-3, connecting telephone communication by connecting the subscriber of the input call number, and waiting until a transmission key is input (steps S8-4 through S8-6); and connecting all waiting subscribers to perform the conferencing communication if said transmission key is input in said step S8-6 (step S8-7).

2. A conferencing method as claimed in claim 1, wherein said call waiting step S3 is comprised of:

determining whether a call waiting function is offered to a new subscriber proposing a busy conference request if a busy conference request of a conferencing function subscriber is received from said new subscriber during the conferencing communication (steps S3-1 and S3-2);

outputting a call waiting signal to the subscriber subject to check by said conference call supervisor for said busy conference request, the conferencing function subscriber to notify that there is said busy conference request if said new subscriber is equipped with the call waiting function in said steps S3-1 and S3-2, and determining the input of a transmission key from said conferencing function subscriber (steps S3-3 and S3-4); outputting a call waiting signal to all subscribers attending the conferencing communication to hold the communication if a transmission key is input in the steps S3-3 and S3-4 (step S3-5);

connecting a new subscriber and said busy conference requested subscriber to perform a telephone communication between both parties and determining whether a transmission key signal is input (steps S3-6 and S3-7); and canceling said call waiting signal for all subscribers allowed to be waited in the course of conferencing communication by said conference call supervisor, and outputting a call waiting signal to a new subscriber to switch to the conferencing communication to resume the conferencing communication with existing subscribers engaged in the conference if the transmission key is input again (step S3-8).

3. A conferencing method as claimed in claim 1, wherein said another subscriber adding step S4 is comprised of:

determining whether a call set-up for another subscriber is requested while telephone communication is performed (step S4-1);

checking by said conference call supervisor whether said conferencing function subscriber registers a subscriber adding function for setting another subscriber, and performing said step S2 if not (step S4-2);

transmitting a call waiting signal to the existing subscriber being engaged in telephone communication, mutually connecting another subscriber and the subscriber equipped with said subscriber adding function to allow both parties to perform telephone communication, and determining whether a transmission key is input, if said conferencing function subscriber registers said subscriber adding function for setting another subscriber (steps S4-3 1 through S4-34); and stopping transmitting of said call waiting signal to the subscriber whose call is awaited and then connecting all parties, i.e., said conferencing function subscriber, another subscriber and awaiting subscriber so that all parties perform said conferencing communication (step S4-4).

4. A conferencing method as claimed in claim 1, wherein said another subscriber adding step S4 is comprised of:

determining whether a call set-up for another subscriber is requested while telephone communication is performed (step S4-1);

checking by said conference call supervisor whether said conferencing function subscriber registers a subscriber adding function for setting another subscriber, and performing said step S2 if not (step S4-2);

transmitting a call waiting signal to the existing subscriber being engaged in telephone communication, mutually connecting another subscriber and the subscriber equipped with said subscriber adding function to allow both parties to perform telephone communication, and determining whether a transmission key is input, if said conferencing function subscriber registers said subscriber adding function for setting another subscriber (steps S4-31 through S4-34); and stopping transmitting said call waiting signal to the subscriber whose call is awaited and then connecting all parties, i.e., said conferencing function subscriber, another subscriber and awaiting subscriber so that all parties perform said conferencing communication (step S4-4).

5. A conferencing method for a telephone switch system comprising the steps of:

performing a basic communication by a conferencing communication or a general telephone communication between subscribers (step S1);

conferencing with a conferencing function subscriber by selecting the conferencing function during the basic communication (step S2);

making an existing conference attendee wait and communicating with another subscriber if there is a call request from another subscriber during the conferencing communication (step S3);

adding another subscriber during the conferencing communication and allowing the conference to be performed additionally (step S4), and a conference call supervisor controlling the adding of another subscriber by the conference function subscriber by a conference call supervisor;

conferencing again after said steps S3 and S4 (step S5);

checking whether said conferencing function subscriber generates subscriber deleting ID by said conference function supervisor and performing said conferencing procedure of said step S2 if not (step S6);

selectively performing a subscriber deletion procedure if said subscriber deleting ID is generated in said step S6 and then going back to said conferencing step S2 (step S7);

deleting/adding subscribers (step S8); and the conferencing function subscriber code in said steps S8-1 through S8-3 is given such that '1' is given to the subscriber who first requested for said conferencing communication, '2' is given to the subscriber who is connected with said first requesting subscriber by making a call to said subscriber, and serial codes being set in the order of subscribers attending in said conferencing communication.

6. A conferencing method as claimed in claim 5, wherein said call waiting step S3 is comprised of:

determining whether a call waiting function is offered to a new subscriber proposing a busy conference request if a busy conference request of a conferencing function subscriber is received from said new subscriber during conferencing communication (steps S3-1 and S3-2);

outputting a call waiting signal to the subscriber subject to check for said busy conference request, the conferencing function subscriber to notify that there is said busy conference request if said new subscriber is equipped with the call waiting function-in said steps S3-1 and S3-2, and determining the input of a transmission key from said conferencing function subscriber (steps S3-3 and S3-4);

outputting a call waiting signal to all subscribers attending the conferencing communication to hold the communication if a transmission key is input in the steps S3-3 and S3-4 (step S3-5);

connecting a new subscriber and said busy conference requested subscriber to perform a telephone communication between both parties and determining whether a transmission key signal is input (steps S3-6 and S3-7); and canceling said call waiting signal for all subscribers let to be waited in the course of conferencing communication, and outputting a call waiting signal to a new subscriber to switch to the conferencing communication to resume the conferencing communication with existing subscribers engaged in the conference if the transmission key is input again (step S3-8).

7. A conferencing method as claimed in claim 5, wherein said another subscriber adding step S4 is comprised of:

determining whether a call set-up for another subscriber is requested while telephone communication is performed (step S4-1);

checking whether said conferencing function subscriber registers a subscriber adding function for setting another subscriber, and performing said step S2 if not (step S4-2);

transmitting a call waiting signal to the existing subscriber being engaged in telephone communication, mutually connecting another subscriber and the subscriber equipped with said subscriber adding function to allow both parties to perform telephone communication, and determining whether a transmission key is input, if said conferencing function subscriber registers said subscriber adding function for setting another subscriber (steps S4-31 through S4-34); and stopping transmitting said call waiting signal to the subscriber whose call is waited and then connecting all parties, i.e., said conferencing function subscriber, another subscriber and waiting subscriber so that all parties perform said conferencing communication (step S4-4).

* * * * *